United States Patent
Manone et al.

(10) Patent No.: US 8,465,245 B2
(45) Date of Patent: Jun. 18, 2013

(54) WHEEL RESTRAINT SYSTEMS

(75) Inventors: Joseph Manone, Mequon, WI (US);
Kyle Nelson, Cedarburg, WI (US);
Norbert Hahn, Franklin, WI (US)

(73) Assignee: Rite-Hite Holding Corporation,
Wilwaukee, WI (US)

( * ) Notice: Subject to any disclaimer, the term of this patent is extended or adjusted under 35 U.S.C. 154(b) by 224 days.

(21) Appl. No.: 12/420,653

(22) Filed: Apr. 8, 2009

(65) Prior Publication Data

US 2010/0260586 A1 Oct. 14, 2010

(51) Int. Cl.
*B65G 67/00* (2006.01)
(52) U.S. Cl.
USPC .............................................. 414/401; 188/32
(58) Field of Classification Search
USPC ..... 414/401, 402, 396, 584, 542, 373; 188/32
See application file for complete search history.

(56) References Cited

U.S. PATENT DOCUMENTS

| | | | |
|---|---|---|---|
| 1,172,875 A | | 2/1916 | Cook |
| 2,643,010 A | * | 6/1953 | Hott et al. ...................... 414/584 |
| 3,020,001 A | | 2/1962 | Fischbein |
| 3,902,574 A | * | 9/1975 | Wright ............................ 188/4 R |
| 4,735,542 A | | 4/1988 | Fisher et al. |
| 4,741,661 A | * | 5/1988 | Carey ............................. 414/563 |
| 4,833,442 A | * | 5/1989 | Von Heck ....................... 340/427 |
| 4,969,792 A | * | 11/1990 | Ellis et al. ....................... 414/401 |
| 5,722,810 A | * | 3/1998 | Young et al. ................... 414/563 |
| 5,896,957 A | * | 4/1999 | Berends et al. ................. 188/32 |
| 6,082,952 A | * | 7/2000 | Alexander ...................... 414/401 |
| 6,336,527 B1 | * | 1/2002 | Metz ................................ 188/32 |
| 6,378,956 B1 | * | 4/2002 | Van De Walker .............. 188/4 R |
| 6,478,525 B2 | * | 11/2002 | Hageman et al. .............. 414/401 |
| 6,589,003 B2 | * | 7/2003 | Berends ......................... 414/401 |
| 6,676,360 B2 | * | 1/2004 | Springer et al. ............... 414/401 |
| 7,032,720 B2 | | 4/2006 | Jette et al. |
| 2005/0226705 A1 | * | 10/2005 | Wilson ........................... 414/401 |
| 2006/0051196 A1 | | 3/2006 | McDonald |
| 2006/0145460 A1 | * | 7/2006 | Eriksson ..................... 280/765.1 |

OTHER PUBLICATIONS

International Searching Authority, "International Search Report," issued in connection with international application serial No. PCT/US2010/030101, mailed Aug. 13, 2010, 4 pages.
International Searching Authority, "Written Opinion of the International Searching Authority," issued in connection with international application serial No. PCT/US2010/030101, mailed Aug. 13, 2010, 5 pages.

(Continued)

*Primary Examiner* — Saul Rodriguez
*Assistant Examiner* — Glenn Myers
(74) *Attorney, Agent, or Firm* — Hanley, Flight & Zimmerman, LLC

(57) ABSTRACT

A wheel restraint for restraining a vehicle at a loading dock includes a wheel chock suspended from a tether. The tether hangs from an overhead beam such that the wheel chock can be swung down and underneath the vehicle and placed directly in front of a wheel of the vehicle. A pin can be used to help hold the chock to an anchor that is fastened to a driveway of the loading dock. The orientation of the pin and the anchor holes in which the pin can be selectively inserted prevents the chock from tipping back and makes the restraint more tolerant of dirt, ice and other contaminants. In some examples, an offset between the beam and the wheel results in the tether urging the chock toward the anchor.

22 Claims, 14 Drawing Sheets

OTHER PUBLICATIONS

International Bureau, "International Preliminary Report on Patentability," issued in connection with international application serial No. PCT/US2010/030101, mailed Oct. 20, 2011, 6 pages.

Canadian Intellectual Property Office, "Office Action," issued in connection with Canadian application serial No. 2,758,345, issued Jan. 3, 2013, 3 pages.

* cited by examiner

WHEEL RESTRAINT SYSTEMS

FIELD OF THE DISCLOSURE

The subject disclosure generally pertains to restraining a vehicle at a loading dock and, more specifically, to wheel restraint systems.

BACKGROUND

When a truck, trailer, or some other vehicle is parked at a loading dock, a vehicle restraint is often used to keep the truck from inadvertently moving away from an elevated platform of the dock. Preventing the vehicle from inadvertently moving forward allows a forklift truck to safely drive between the dock platform and the truck for the purpose of loading or unloading the cargo inside the truck.

A variety of vehicle restraints are available that can be installed at a loading dock. For example, a vehicle restraint can include an ICC-style restraint that engages a truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels.

Perhaps the most common wheel restraint is simply a wheel chock that wedges between the driveway and the underside of the wheel. Wheel chocks, however, often slip out of position on driveways that are slippery due to oil, rain, ice, sand, gravel, or dirt. In order to provide a meaningful obstruction, wheel chocks need to be relatively large, which can make them too heavy to carry. Moreover, wheel chocks usually are loose items that do not permanently attach to the loading dock area, so they often get misplaced.

Consequently, a need exists for a wheel chock system that overcomes the limitations and drawbacks of current systems.

DETAILED DESCRIPTION

Figure 1:
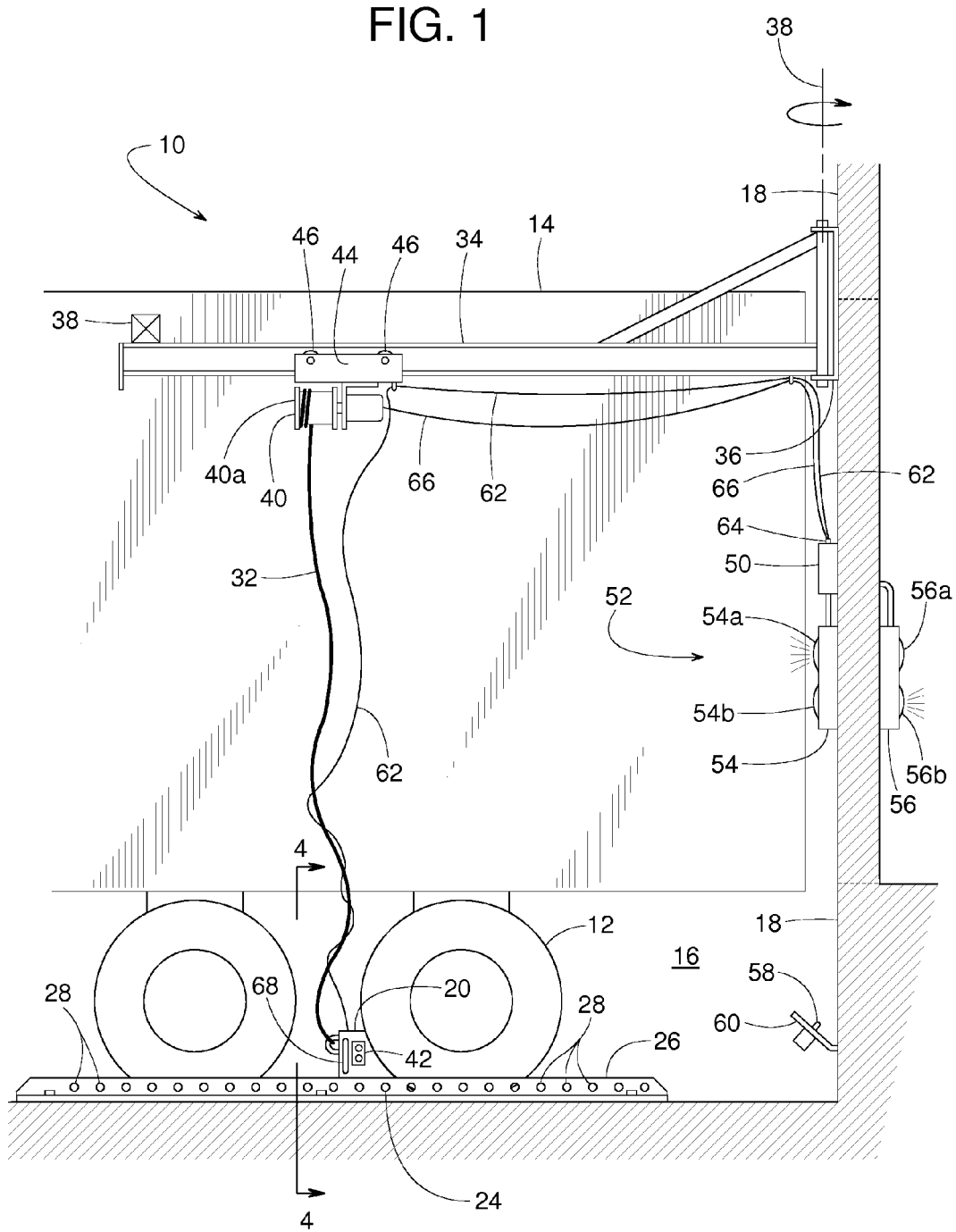
FIG. 1 is a side view of an example wheel restraint system described herein and shown in a blocking position.

FIGS. 1-5 show a wheel restraint system 10 with a wheel chock 20 for restraining at least one wheel 12 of a vehicle 14 at a loading dock 16. Restraint 10 is shown in a blocking position in FIGS. 1 and 4, a raised position in FIGS. 2 and 5, and a stored position in FIG. 3. In the blocking position, restraint 10 helps hold or restrain vehicle 14 adjacent to a dock face 18 (e.g., prevents the vehicle 14 from moving away from the dock face 18) so that cargo can be safely conveyed on and off of vehicle 14.

To limit the wheel chock's and thus the wheel's horizontal movement (particularly in a forward direction away from dock face 18) and to prevent wheel 12 from tipping or over-turning chock 20 over about its heal 22 (FIG. 2), a pin 24 selectively couples and/or disengages (e.g., removably couples) chock 20 to a chock anchor 26. In the illustrated example, anchor 26 is a perforated structural angle fastened to the driveway of dock 16, and pin 24 extends substantially horizontally from the side of chock 20 to be selectively inserted into one of a series of holes 28 in anchor 26. The longitudinal centerlines of pin 24 and holes 28 run substantially horizontally to make the pin-to-hole connection more tolerant of dirt, ice and other contaminants. When chock 20 engages anchor 26, the orientation (e.g., a horizontal orientation) of pin 24 prevents the chock's leading edge 30 (FIG. 2) from lifting up, thus preventing chock 20 from tipping over about its heal 22. As a further precaution against tipping, pin 24 is spaced closer to leading edge 30 than to heal 22. In other examples, anchor 26 and/or pin 24 may have any other suitable shape, orientation or configuration to prevent chock 20 from tipping over about its heal 22.

In this example, anchor 26 is disposed laterally (in a direction horizontal and parallel to dock face 18) relative to both wheel 12 and chock 20. This position allows anchor 26 to not only help prevent forward (e.g., horizontal) movement of the wheel 12, but also helps prevent chock 20 from itself moving laterally away from wheel 12 and toward anchor 26. Given the forces and geometry involved, wheel 12, when attempting to depart, could exert such a lateral force on chock 20—potentially resulting in chock 20 moving laterally to a non-blocking position relative to wheel 12. This undesirable result is eliminated or minimized by the lateral position of anchor 26 being able to react to such lateral forces and maintain chock 20 in its preferred lateral blocking position.

Figure 3:
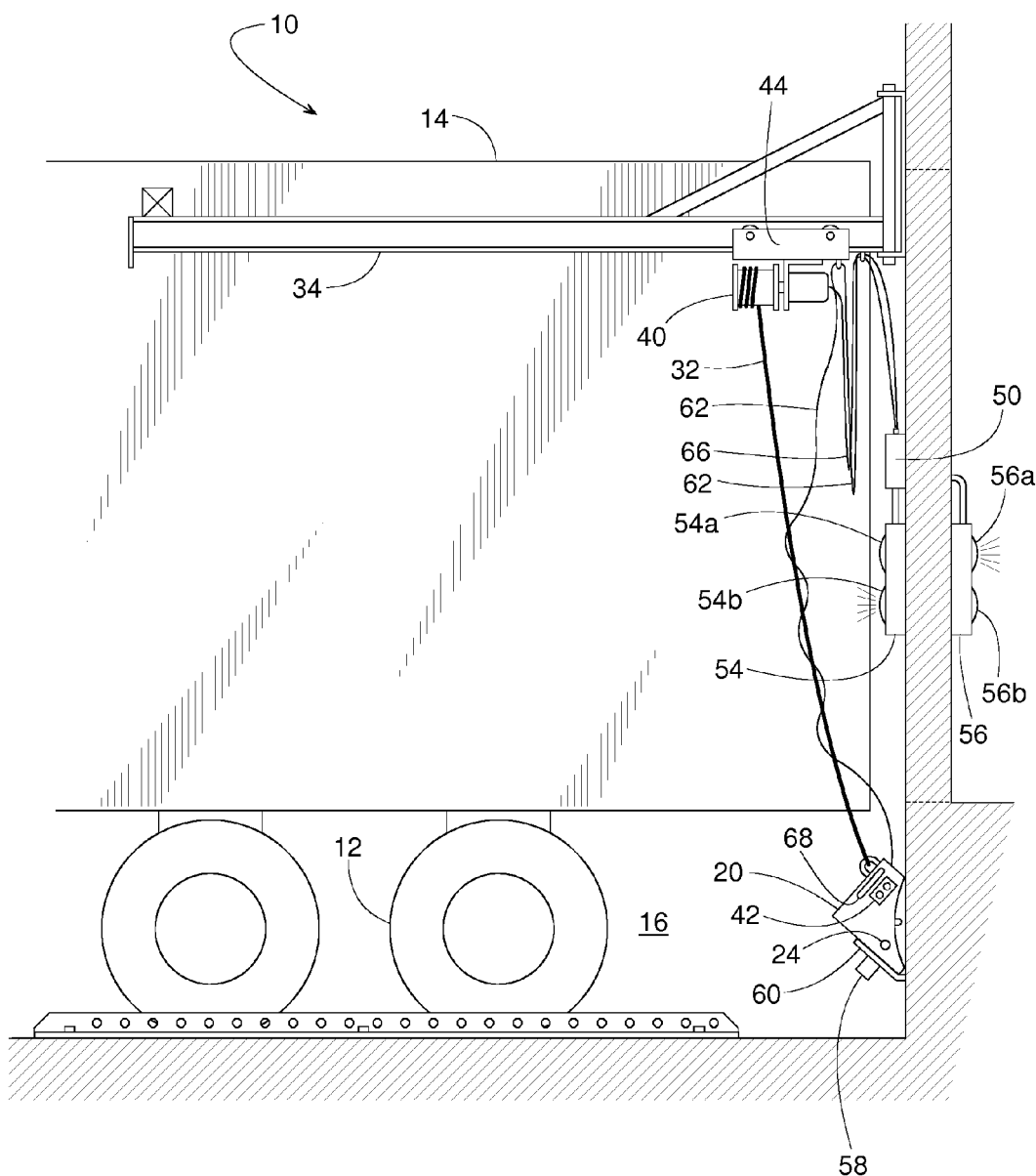
FIG. 3 is a side view of the example wheel restraint system of FIG. 1, but showing the restraint in a stored position.
Figure 4:
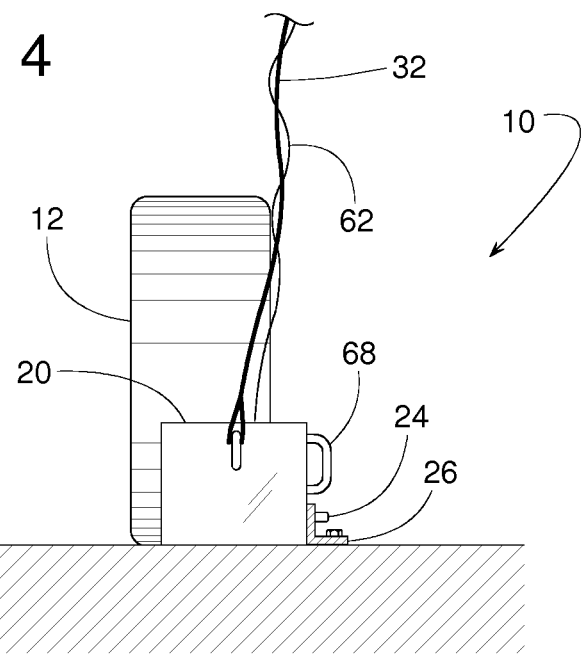
FIG. 4 is an end view taken along line 4-4 of FIG. 1.
Figure 5:
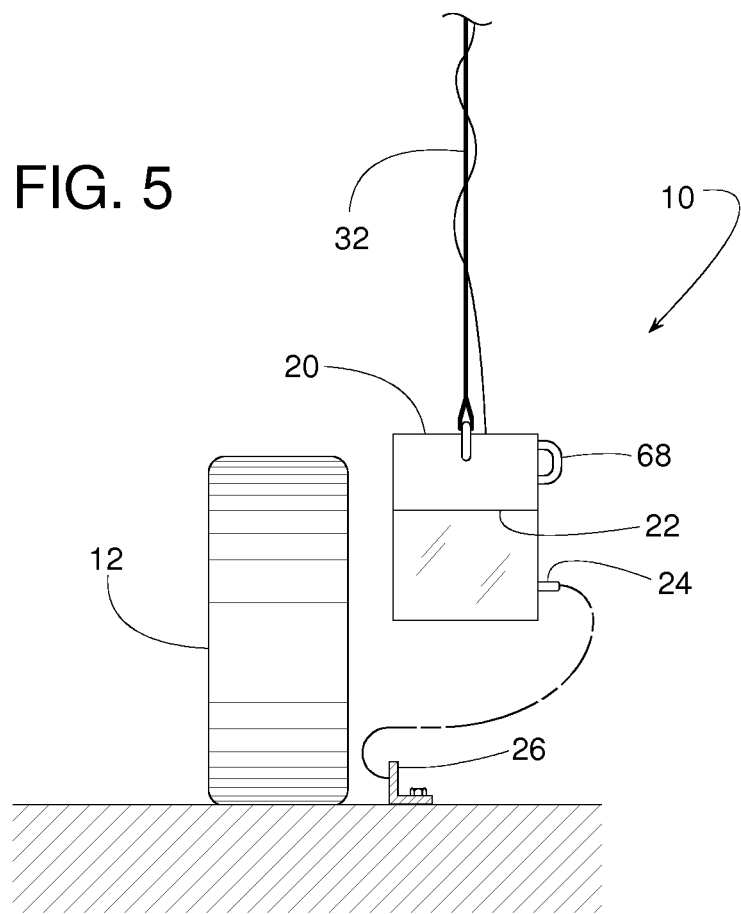
FIG. 5 is an end view taken along line 5-5 of FIG. 2.

To facilitate movement of wheel chock 20 between the blocking position of FIG. 1 and the stored position of FIG. 3, a tether 32 suspends chock 20 from a beam 34. Tether 32 is schematically illustrated to represent any pliable elongate member. Examples of tether 32 include, but are not limited to, a cable, a cord, a strap, a chain, a rope, etc.

For the example shown in FIGS. 1-5, a beam anchor 36 attaches beam 34 to dock face 18. In the illustrated example, the beam 34 is pivotally mounted to the dock face 18 to pivot about a generally vertical axis 38. Although the pivotal mounting permits some lateral positioning (e.g., a direction generally horizontal and parallel to dock face 18) of chock 20 relative to chock anchor 26 and vehicle 14, such pivotal movement and lateral positioning is not necessary, particularly if chock anchor 26 lies along a fixed line approximately underneath beam 34. For installations where beam 34 is pivotally mounted, beam 34 preferably includes a lateral bumper 38 to prevent beam 34 from swinging too hard against the side of vehicle 14. As an alternative to bumper 38, a stop could be attached to dock face 18 or to beam anchor 36, wherein the stop would limit the distance between the vehicle 14 and the beam 34 (e.g., how far beam 34 could swing toward vehicle 14).

In some cases, the beam 34 is not pivotal but instead is mounted generally parallel to and laterally offset to chock anchor 26 such that there is sufficient horizontal clearance between beam 34 and the side of vehicle 14 and such that the lateral offset between beam 34 and anchor 26 urges chock 20 toward (e.g., sideways against) chock anchor 26, thus ensuring the engagement of pin 24.

To help offset the weight of chock 20, the upper end of tether 32 is attached to a retracting mechanism 40. A retracting mechanism may be any device that applies tension to a pliable elongate member (e.g., member 32) to support at least some of the chock's weight while the chock 20 moves between the retracting mechanism and the driveway (e.g., substantially vertically or upward). The retracting mechanism 40 may include or implemented by, but is not limited to, an electric hoist, a pneumatic hoist, a helical spring, an elastic cord, a coiled band spring, a gas spring, a counterweight, a counterbalancer etc. In the example illustrated in FIGS. 1-5, the retracting mechanism 40 is a hoist 40a (e.g., an electric or pneumatic hoist).

An electric switch 42 can be used for controlling the hoist's 40a vertical feed of tether 32. Switch 42 can be installed at any convenient stationary or portable location. Switch 42, for instance, could be integrally formed with or attached directly to chock 20 (as shown), mounted to dock face 18, suspended from a trolley 44 on beam 34, or be part of a wireless remote control unit.

To adjust the position (e.g., the horizontal position) of chock 20 relative to the vehicle 14 or the dock face 18, the retracting mechanism 40 of the illustrated example is operatively coupled to trolley 44, which includes slide blocks or rollers 46 for translating along the length of beam 34.

In some examples, chock 20 includes a sensor 48 (e.g. a push button switch—see FIG. 2) to detect whether chock 20 is in the blocking position. Sensor 48 can be installed, as shown, where it can sense the presence of wheel 12, or sensor 48 could be installed at a position where it can detect the proximity of the chock 20 relative to, for example, chock anchor 26 or the driveway of dock 16. The sensor 48 of the illustrated example provides a signal to a controller 50, which in turn controls the operation of a signal system 52. For the illustrated example, signal system 52 comprises an outdoor set of lights 54 and an indoor set of lights 56. The outdoor set 54 includes a red light 54a and a green light 54b to aide the driver of vehicle 14, and indoor set 56 includes a red light 56a and a green light 56b for assisting dock workers inside the building.

When chock 20 is safely in the blocking position of FIG. 1, red light 54a informs the driver that vehicle 14 is blocked and should not depart from dock 16, and green light 56b informs the dockworkers inside the building that vehicle 14 is secured.

Figure 2:
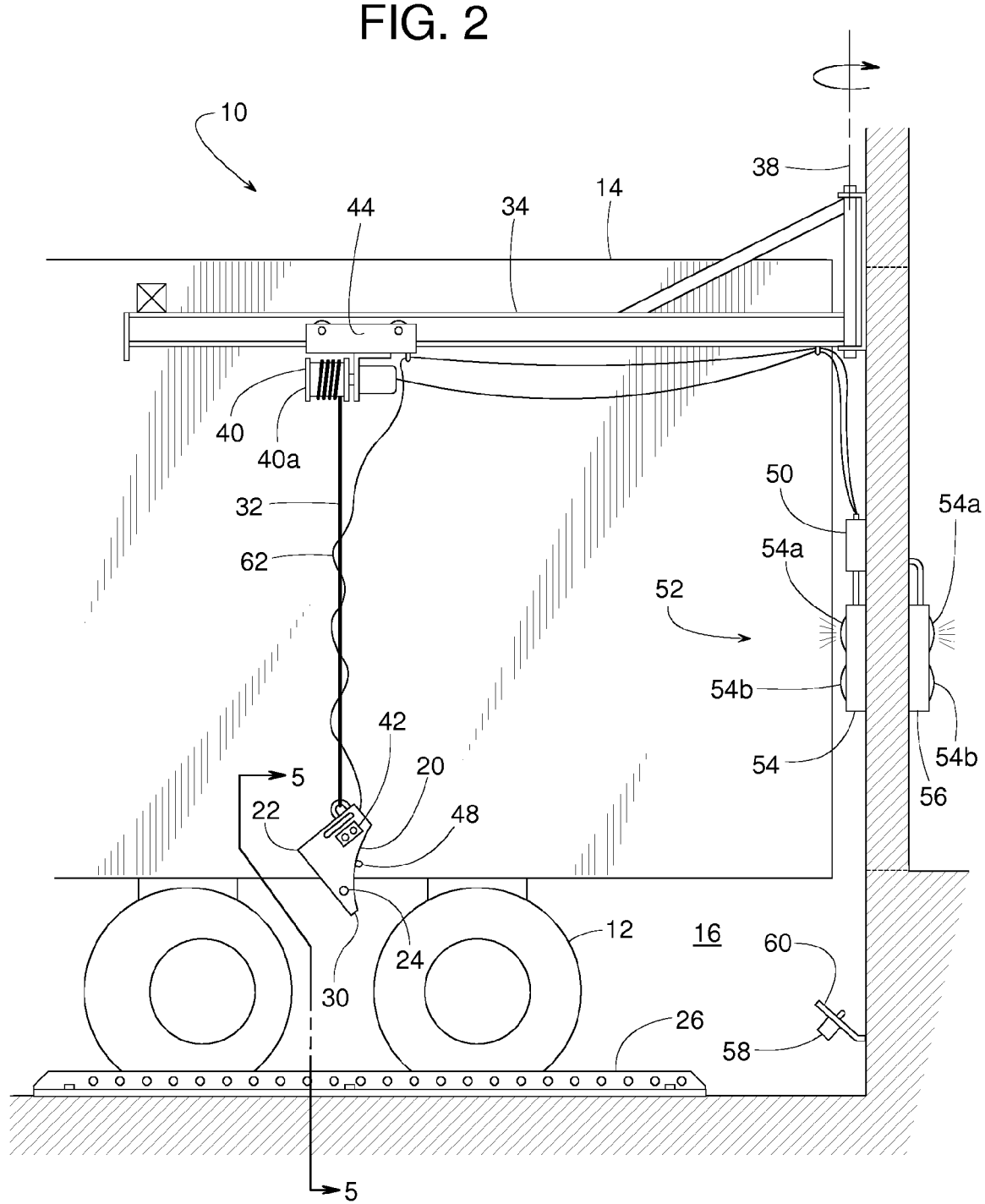
FIG. 2 is a side view of the example wheel restraint system of FIG. 1, but showing the restraint in a raised position.

When chock 20 is in the raised position of FIG. 2, red light 56a warns the dockworkers that vehicle 14 is not secured. At the same time, outdoor set 54 could have red light 54a to indicate that chock 20 is not yet stored. Alternatively, green light 54b could inform or indicate to the driver that the vehicle 14 is released even though chock 20 might not yet be in its stored position.

When chock 20 is stored, as shown in FIG. 3, a second sensor 58 detecting when chock 20 is properly stored in a holder 60 could send a signal to controller 50 so that green light 54b indicates that chock 20 is stored and vehicle 14 can depart from dock 16.

An electrical line 62 strung along tether 32 and running between wheel chock 20 and a fixed point 64 on dock 16 can be used for conveying an electrical signal from sensor 48 and/or switch 42 to controller 50. To power hoist 40a, another electrical line 66 could extend between hoist 40a and point 64 on controller 50.

Typical operation of restraint system 10 could be as follows. Vehicle 14 backs into dock 16, while chock 20 is stored, as shown in FIG. 3. Next, an operator actuates switch 42 to lift chock 20 out of holder 60. With the aide of a handle 68 on chock 20 and the freedom of translation provided by trolley 44, the operator manually moves chock 20 to the raised position of FIG. 2. Once the elevated chock 20 is generally ahead (e.g., in front) of wheel 12, the operator actuates switch 42 to lower chock 20 onto the driveway, directly in front of wheel 12. With chock 20 on the driveway, the operator slides chock 20 toward chock anchor 26 such that pin 24 extends into one of the holes 28 in anchor 26. When wheel 12 is properly chocked, signal system 52 actuates signal lights 54 and 56 accordingly. To later release vehicle 14, the operation is reversed.

Figure 6:
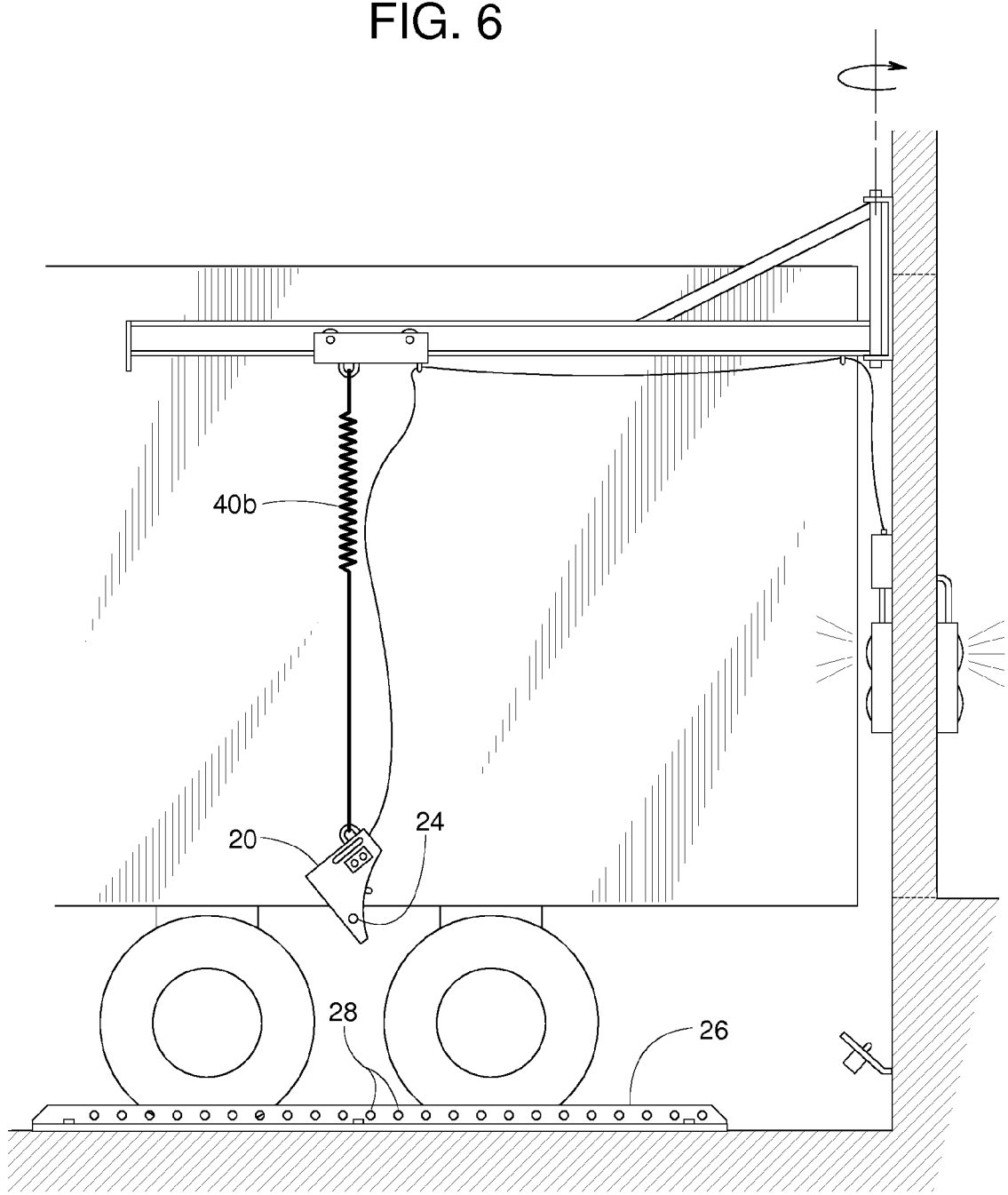
FIG. 6 is a side view of another example wheel restraint system described herein.
Figure 7:
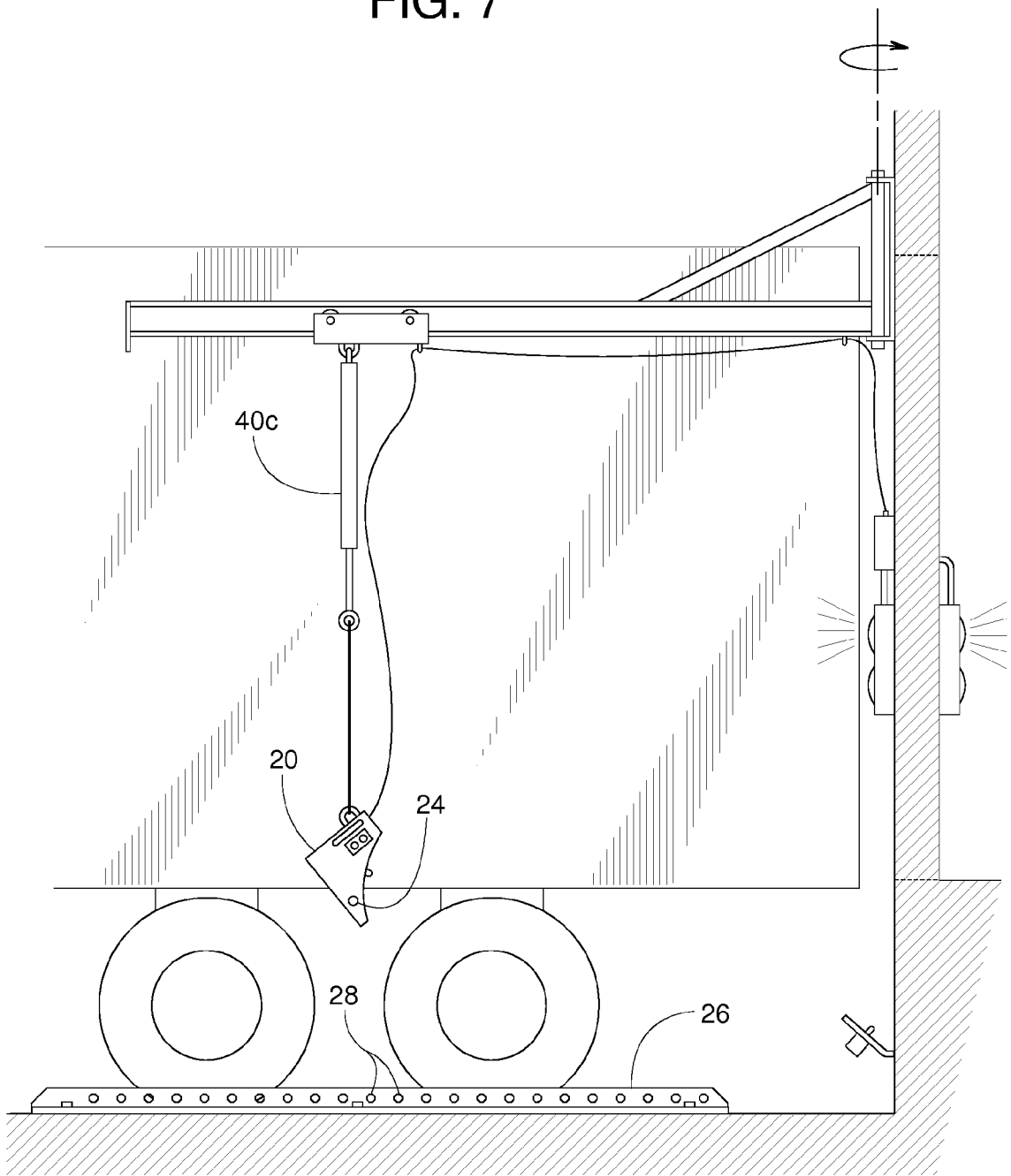
FIG. 7 is a side view of yet another example wheel restraint system described herein.
Figure 8:
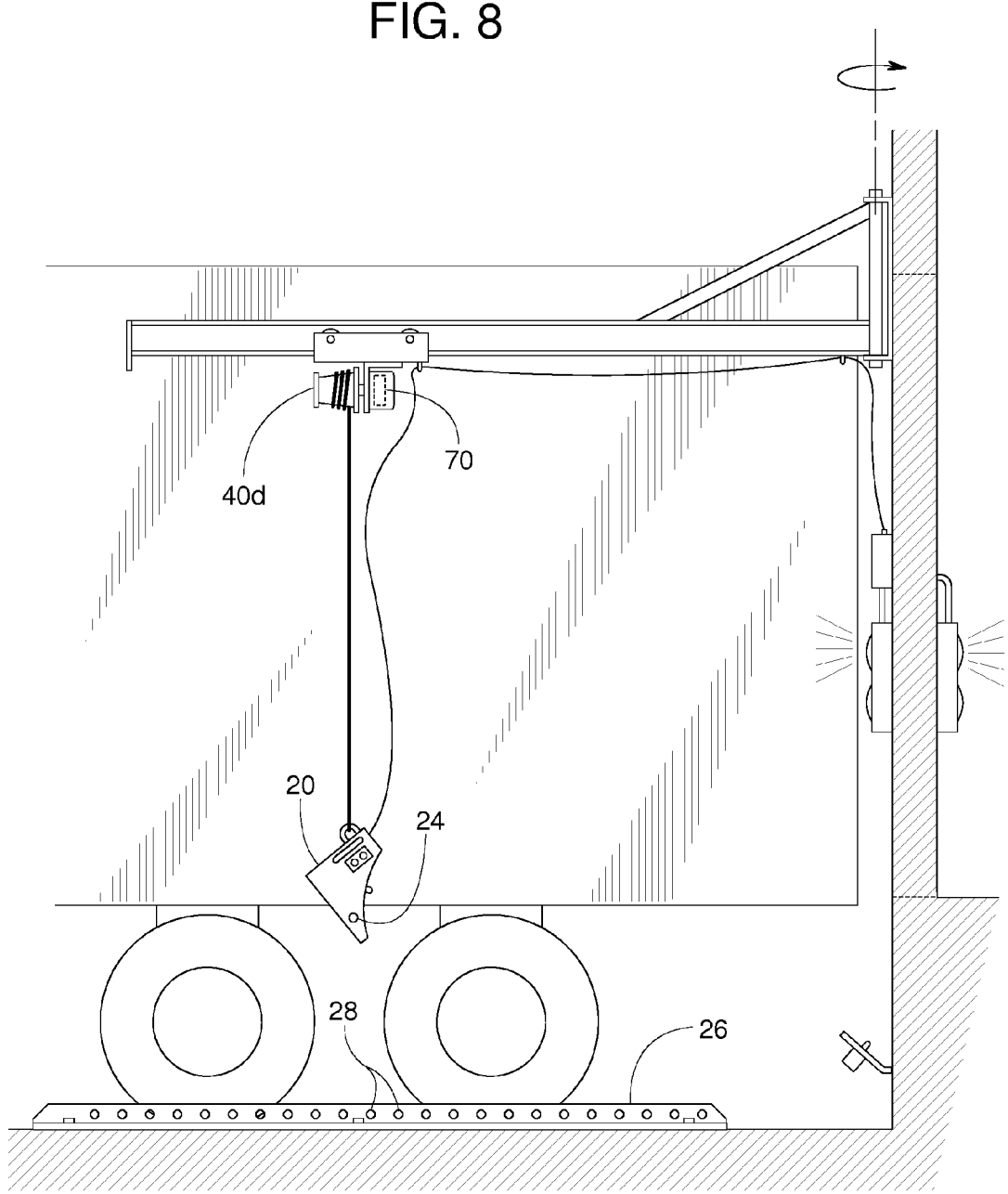
FIG. 8 is a side view of yet another example wheel restraint system described herein.

FIGS. 6, 7 and 8 illustrate example wheel restraint systems similar to the example wheel restraint system 10 of FIGS. 1-5, but are implemented with alternative retracting mechanisms. In FIG. 6, the retracting mechanism is a spring 40b (e.g., helical tension spring, elastic cord, etc.). In FIG. 7, the retracting mechanism is a linear actuator such as, for example, a gas spring 40c. In FIG. 8, the retracting mechanism is a counterbalancer 40d having an internal coiled band spring 70 that provides a nearly constant retracting (e.g., upward) force. Example manners of implementing the counterbalancer 40d are described in U.S. Pat. Nos. 3,020,001 and 1,172,875; which are specifically incorporated by reference herein.

In each of the examples of FIGS. 6-8, the retracting mechanism are configured to only partially offset the weight of chock 20 so that when chock 20 is released by the operator, chock 20 will still descend to the driveway on its own. In alternative examples, retracting mechanisms 40b, 40c, or 40d exert sufficient vertical lift to bias chock 20 upward. In such examples, a user could manually force chock 20 down against the driveway, and pin 24 engaging anchor 26 could hold chock 20 in its blocking position. In examples where chock 20 is biased upward, one or more additional pins 24 could be added to chock 20 to engage two or more spaced-apart holes 28 in anchor 26, whereby multiple pins 24 could hold chock 20 generally flat against the driveway. In still other examples, mechanism 40b, 40c or 40d exerts an upward lift that is substantially equal to the weight of chock 20 so that chock 20 generally stays at the elevation at which it is positioned or placed relative to, for example, the driveway.

Figure 9:
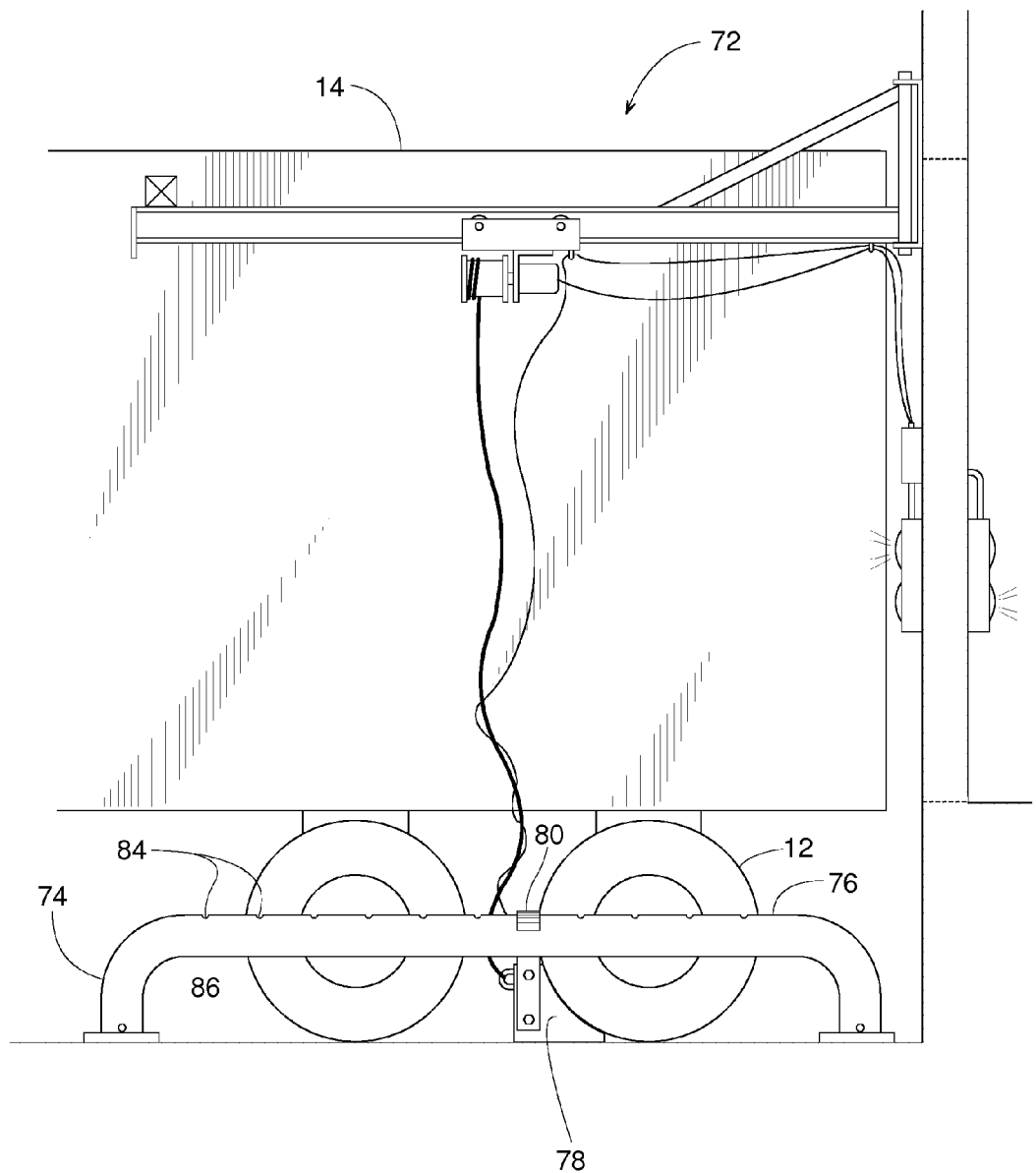
FIG. 9 is a side view of yet another example wheel restraint system described herein.
Figure 10:
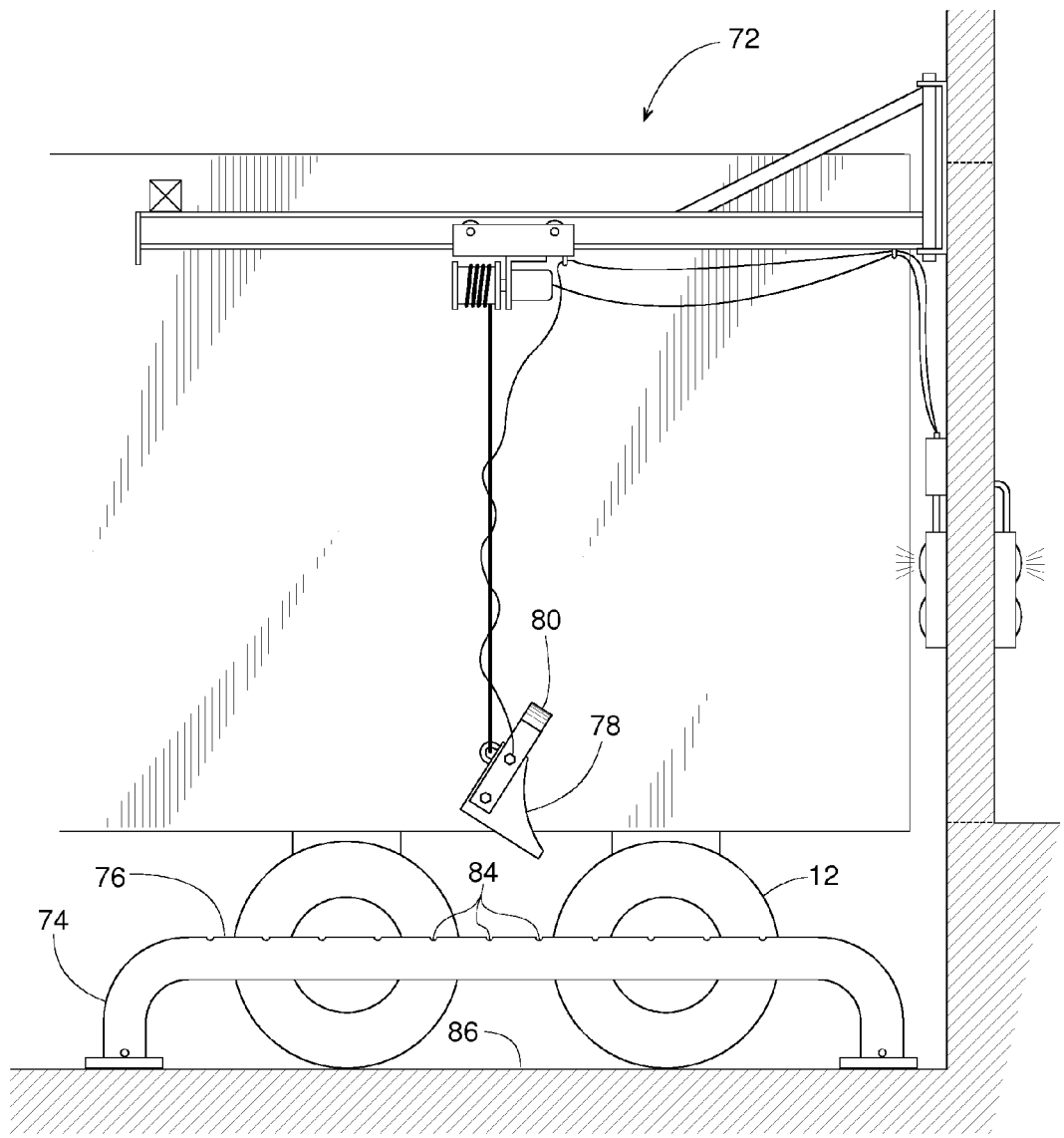
FIG. 10 is a side view of the example wheel restraint system of FIG. 9, but showing the restraint in a raised position.
Figure 11:
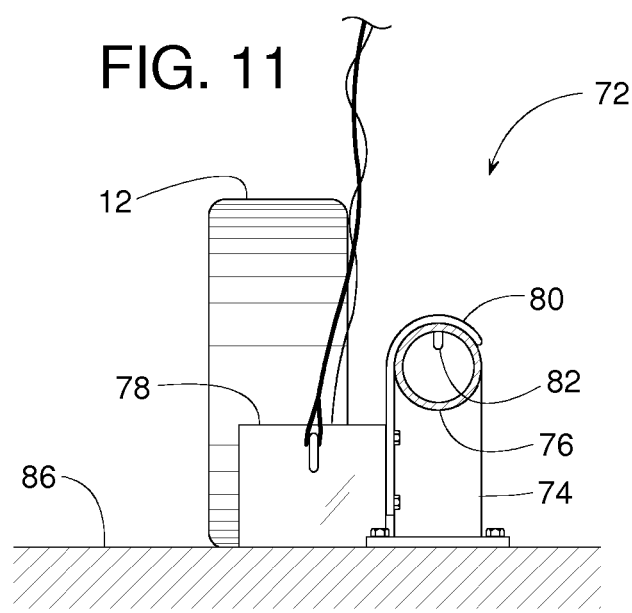
FIG. 11 is an end view of the example wheel restraint system of FIG. 9.
Figure 12:
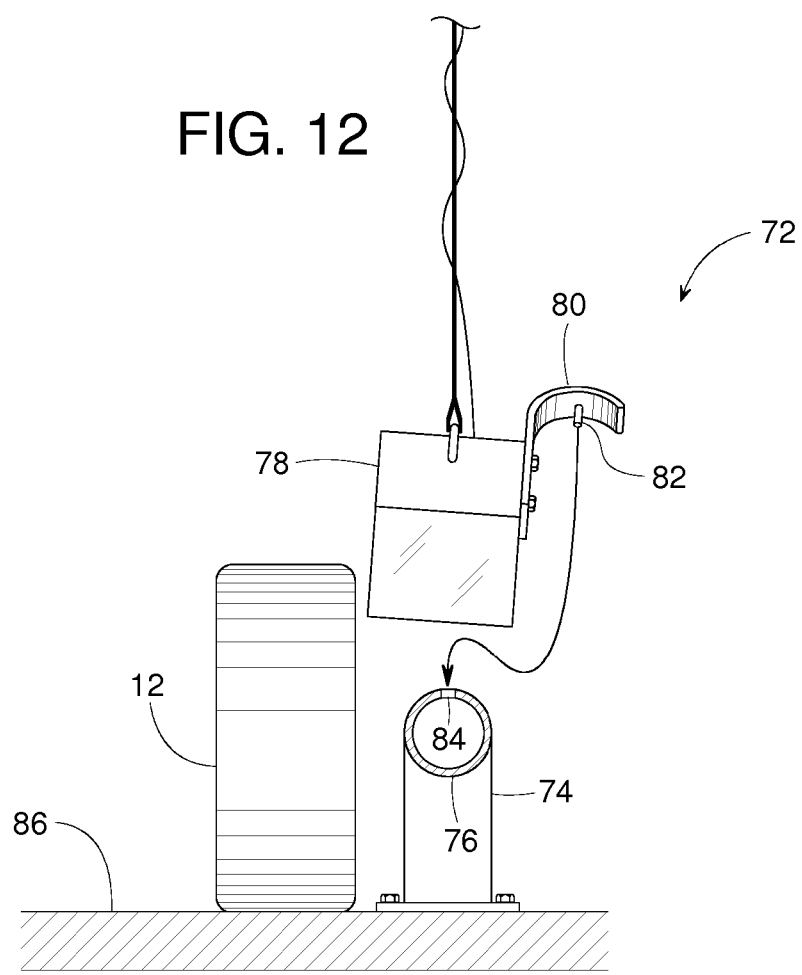
FIG. 12 is an end view of the example wheel restraint system of FIG. 10.

In another example, illustrated in FIGS. 9-12, a wheel restraint system 72 includes a chock anchor 74 having an elevated rail 76. Rail 76 not only helps hold or restrain a wheel chock 78 in position but also serves as a railing that helps guide wheel 12 of vehicle 14 into position for loading and unloading cargo from the vehicle 14. FIGS. 9 and 11 show wheel chock 78 in a blocking position, and FIGS. 10 and 12 show chock 78 in a raised position. In operation, FIGS. 9, 10, 11 and 12 correspond to FIGS. 1, 2, 4, and 5 respectively.

To help hold chock 78 in its blocking position of FIGS. 9 and 11, a curved arm 80 extending from chock 78 selectively engages (FIGS. 9 and 11) and disengages (FIGS. 10 and 12) rail 76. The engagement between arm 80 and rail 76 is enhanced by a pin 82 protruding from arm 80 being able to fit into one of a series of holes 84 in rail 76. It should be noted, however, that pin 82 and hole 84 is just one example of a holding or locking mechanism and that other means for positive engagement between chock 78 and rail 76 or engagement between chock 78 and a driveway 86 are certainly conceivable. Some other examples of holding or engagement include, but are not limited to, friction, clamp, teeth, etc. The same is true for pin 24 and holes 28 of FIGS. 1-8, i.e., pin 24 and holes 28 provide just one example of a positive holding mechanism or means for holding a wheel chock in place.

Figure 13:
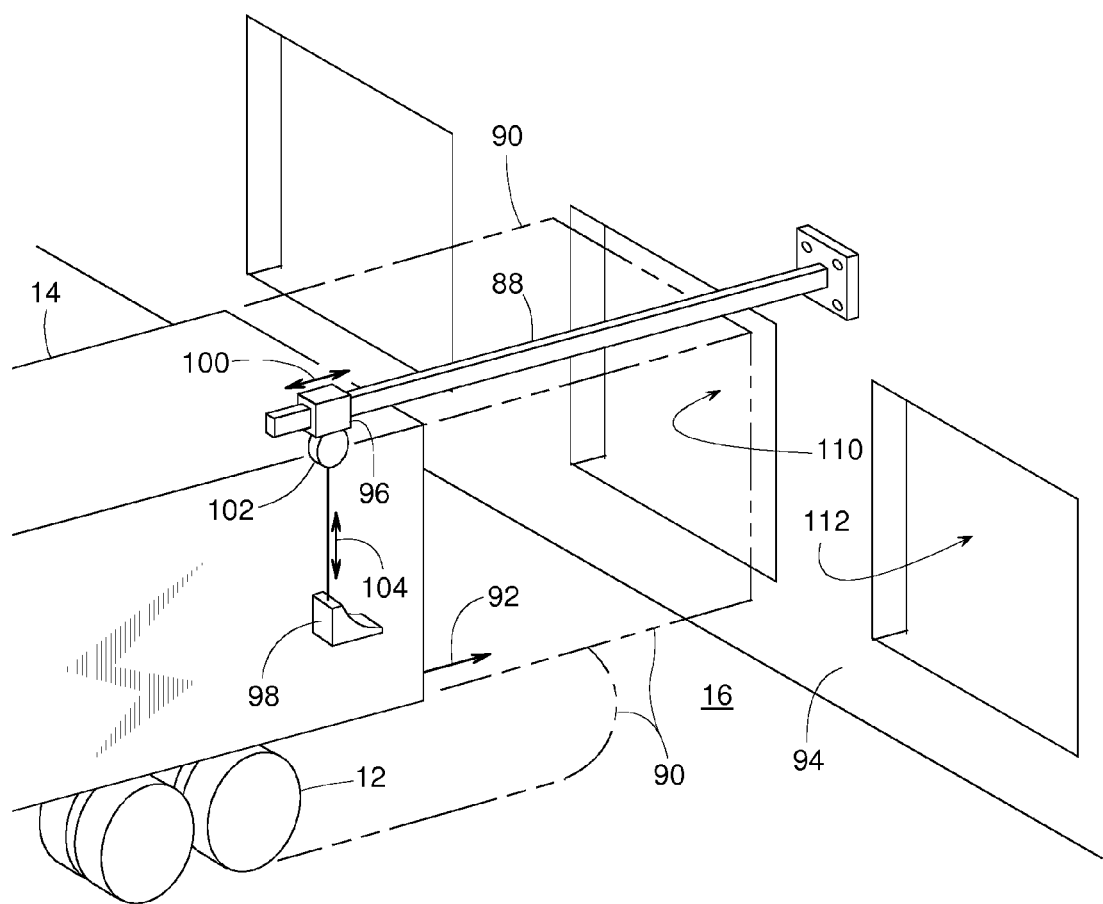
FIG. 13 is a perspective view of an example wheel restraint system described herein, wherein a beam of the wheel restraint system is fixed.

FIGS. 13-16 schematically illustrate different beam configurations that can be used with different wheel chocks including, but not limited to, those shown in FIGS. 1-12. In FIG. 13, a beam 88 is mounted in a substantially fixed, horizontal orientation. To prevent vehicle 14 from accidentally backing into beam 88, the beam 88 of the illustrate example is mounted to remain outside of an approach path 90 of vehicle 14, wherein path 90 is an area defined by vehicle 14 moving in a direction 92 toward loading dock 16 (e.g., toward a wall 94 of dock 16). In the example of FIG. 13, a track follower 96 (e.g., slide block, trolley, etc.) enables a wheel chock 98 (e.g., chock 20 or 78) to travel in a generally horizontal direction 100 parallel to beam 88, and a retracting mechanism 102 (e.g., retracting mechanism 40a, 40b, 40c, 40d, etc.) enables chock 98 to move in a generally vertical direction 104 relative to beam 88.

Figure 14:
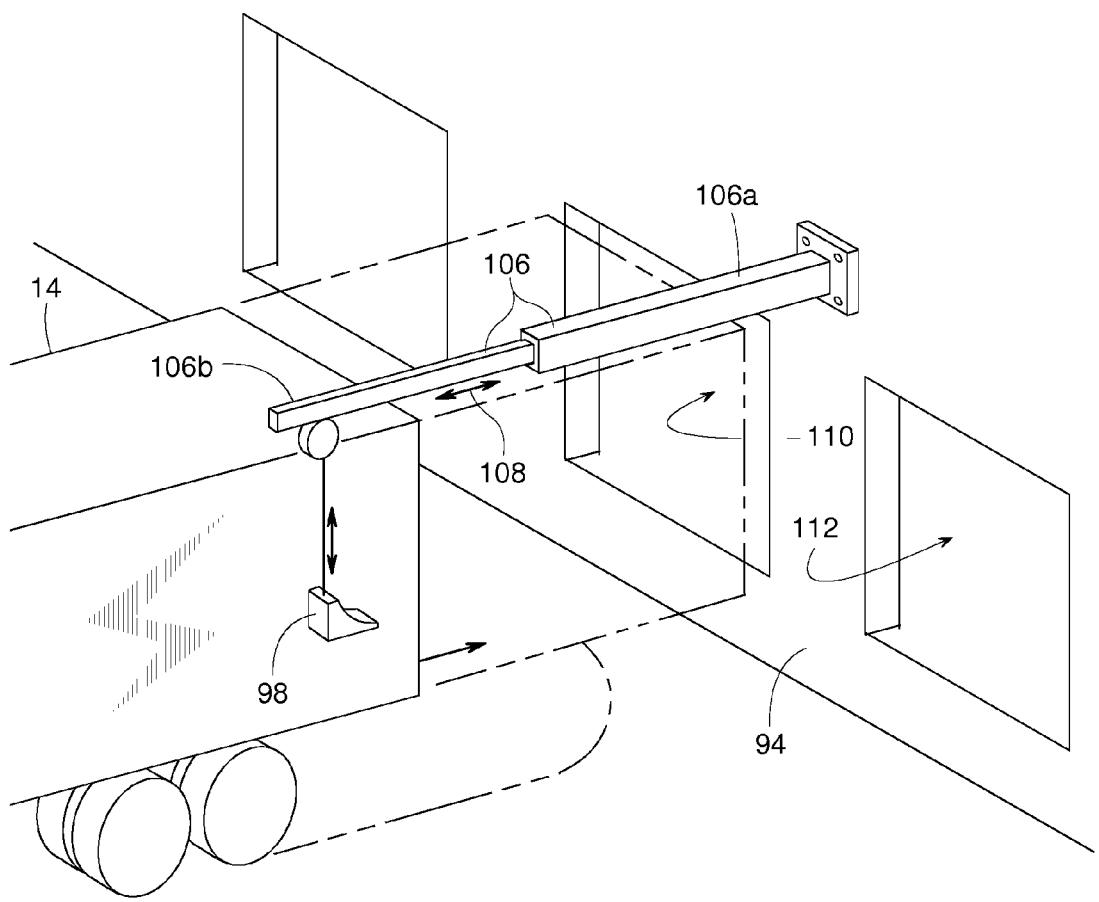
FIG. 14 is a perspective view of yet another example wheel restraint system described herein, wherein the beam is telescopic.
Figure 15:
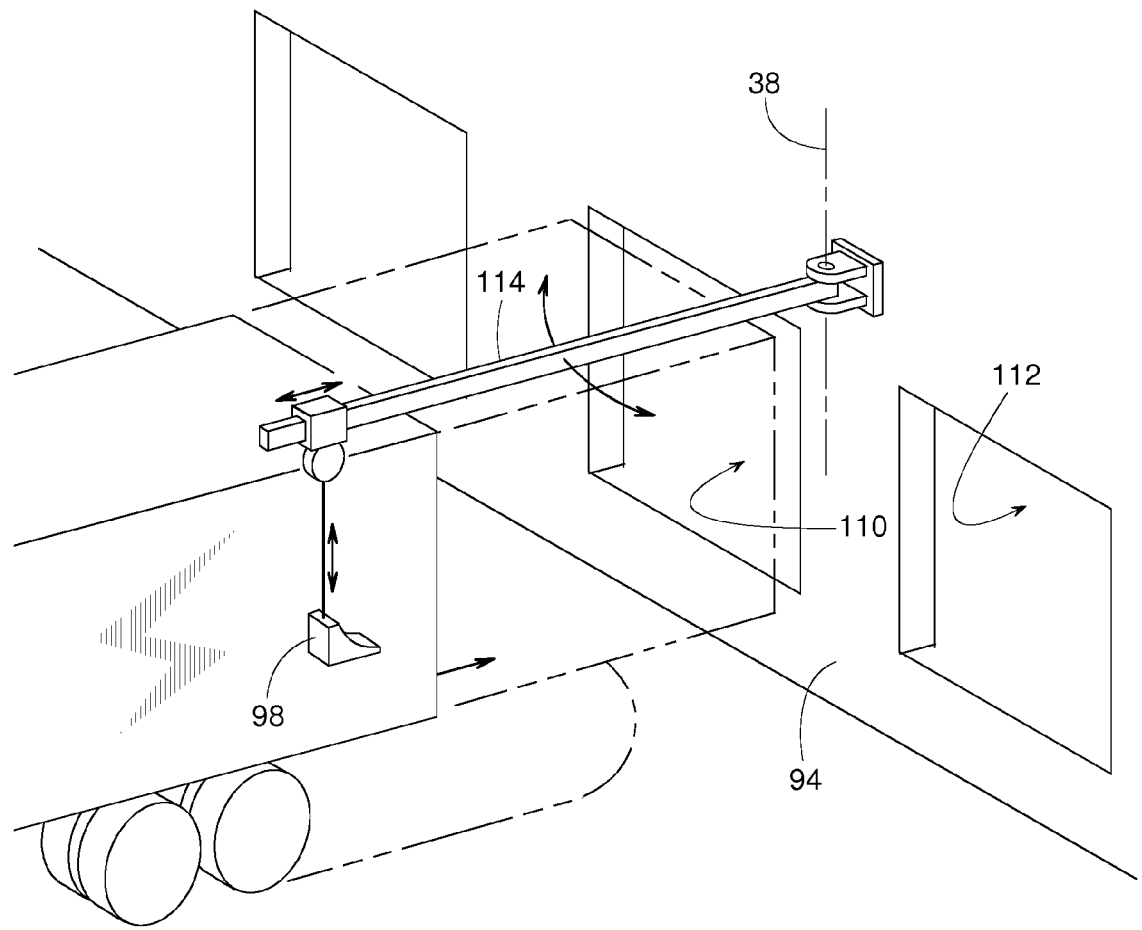
FIG. 15 is a perspective view of yet another example wheel restraint system described herein, wherein the beam is pivotal.

As an alternative to the chock's horizontal movement 100 (FIG. 13), FIG. 14 shows how a telescopic beam 106 can provide wheel chock 98 with similar horizontal movement 108. In this example, one section 106a of beam 106 can be fixed to wall 94, while an extendable section 106b can extend or retract in direction 108. Beams 88 and 106 of FIGS. 13 and 14 can be mounted midway between two adjacent doorways 110 and 112 so that chock 98 can be used for blocking vehicle 14 at either doorway 110 or 112. This works particularly well when doorways 110 and 112 are relatively close to each other.

To use a single wheel chock system at two or more doorways that are farther apart, a beam 114 can be pivotally mounted to wall 94, such as shown in FIG. 15, FIGS. 1-3, and FIGS. 6-10. Such a pivotal mount allows beam 114 to pivot about a generally vertical axis 38, which provides a suspended wheel chock 98 with a greater range of lateral movement.

Figure 16:
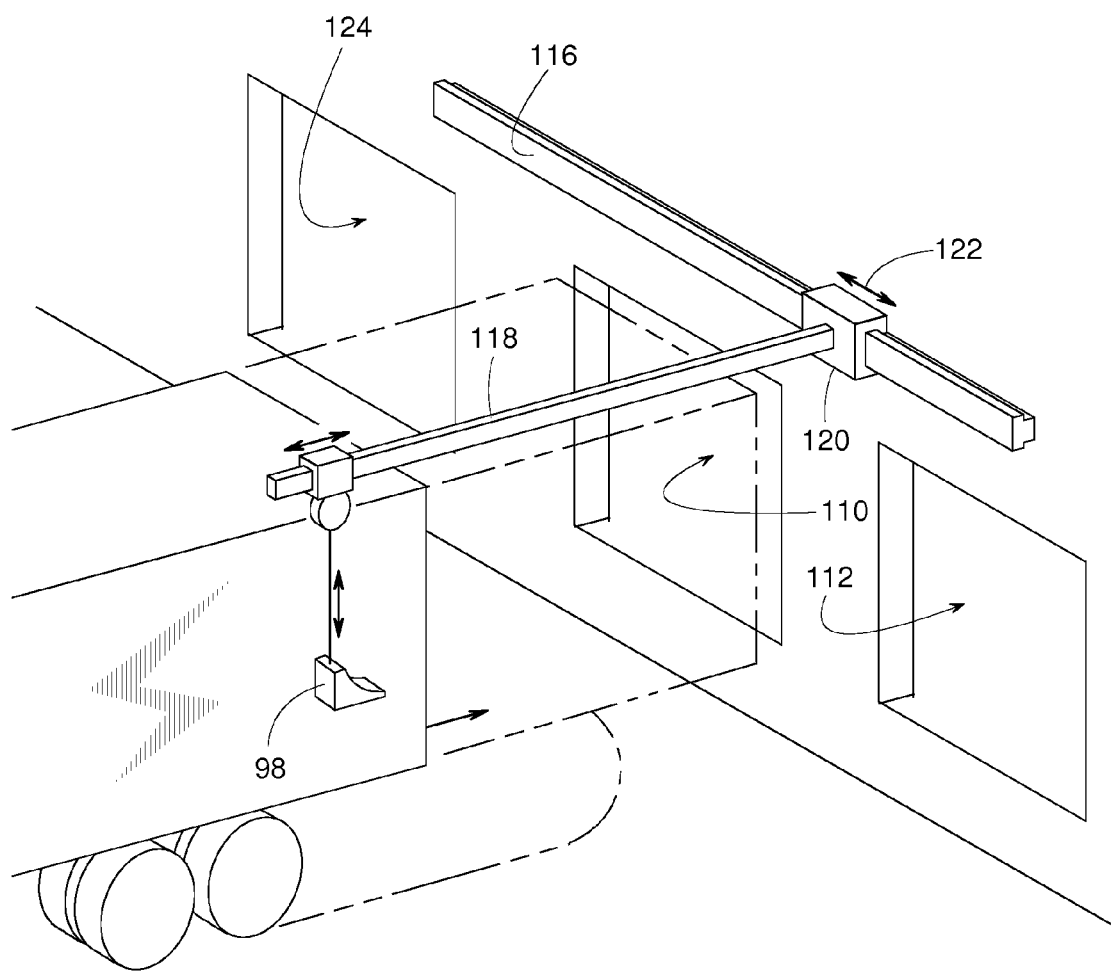
FIG. 16 is a perspective view of yet another example wheel restraint system described herein, wherein the beam is mounted for lateral translation.

Referring to FIG. 16, for even greater lateral movement, an overhead track 116 can be installed above one or more doorways, and a beam 118 can be mounted to a track follower 120 (e.g., slider, trolley, etc.) that enables beam 118 to translate in a direction 122 generally parallel to track 116 so that chock 98 can reach vehicles parked at any of doorways 110, 112 or 124.

It should be noted that the various features that provide pivotal, translatable, telescopic, or fixed mounting can be readily combined and interchanged in the various examples shown in FIGS. 13-16. The pivotal mounting of FIG. 15, for example, could be added to the translating track follower 120 of FIG. 16, or the telescopic feature of FIG. 14 could be added to the mounting arrangements of FIG. 15 or 16. Also, the different wheel chocks and retracting mechanisms can be interchanged among the example wheel restraint systems described herein.

At least some of the aforementioned examples include one or more features and/or benefits including, but not limited to, the following:

In some examples, a wheel chock is suspended from a substantially linear overhead beam.

In some examples, a wheel chock is suspended from a beam selectively or permanently positioned outside the approach path of the vehicle.

In some examples, a wheel chock is vertically retractably suspended from an overhead beam.

In some examples, the weight of a wheel chock is partially offset by the tension in a tether extending from a retracting mechanism.

In some examples, a wheel chock is supported by a hoist or other retracting mechanism that can be controlled by a switch mounted right on the chock itself.

In some examples, a wheel chock is protected from tipping over by having the chock latch onto an anchor using a feature that adds no moving parts to the chock or the anchor.

In some examples, a wheel chock is suspended from a beam that provides suitable structure along which an electrical line can be run.

In some examples, a wheel chock suspended from a beam engaged a chock anchor positioned laterally of the wheel and the chock in its blocking position.

In some examples, a wheel chock suspended from a beam engages an elevated chock anchor that also serves as wheel guide.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A wheel restraint system for engaging a wheel of a vehicle at a loading dock that includes a doorway, wherein the vehicle traverses an approach path as the vehicle moves toward the loading dock, the wheel restraint system comprising:
    a chock anchor mountable to the loading dock adjacent the approach path of the loading dock;
    an elongate beam mountable at the loading dock adjacent an upper edge of the doorway in a generally horizontal orientation relative to the chock anchor and positionable at a location outside the approach path, the beam being substantially parallel to and extending over at least a portion of the chock anchor; and
    a wheel chock coupled for horizontal movement relative to the beam and the chock anchor along the portion of the chock anchor, the wheel chock retractably coupled to the elongate beam between a blocking position and a raised position such that in the blocking position the wheel chock is inside the approach path adjacent the wheel and engages the chock anchor to impede movement of the vehicle away from the loading dock, and in the raised position the wheel chock is spaced away from the chock anchor, is spaced apart from the wheel, and is outside the approach path to allow movement of the vehicle away from the loading dock.

2. The wheel restraint system of claim 1, wherein the beam is positionable to a location outside the approach path, and the beam is to be fixed in the location outside the approach path.

3. The wheel restraint system of claim 1, wherein the beam is positionable to a location outside the approach path by being movable in a substantially horizontal direction.

4. The wheel restraint system of claim 3, wherein the beam is positionable to a location outside the approach path by being pivotal about a substantially vertical axis.

5. The wheel restraint system of claim 3, further comprising a track mountable at the loading dock, wherein the beam is mounted to the track for substantially horizontal movement therealong.

6. The wheel restraint system of claim 1, wherein the beam is longitudinally extendible relative to a dock face of the loading dock.

7. The wheel restraint of claim 1, further comprising a retracting mechanism to couple the wheel chock to the beam such that the weight of the wheel chock is supported by the retracting mechanism and the beam when the wheel chock is in the raised position, and such that substantially none of the weight of the wheel chock is supported by the retracting mechanism and the beam when the wheel chock is in the blocking position.

8. The wheel restraint system of claim 1, further comprising a retracting mechanism coupled to the beam for traveling substantially parallel thereto, wherein the retracting mechanism retractably couples the wheel chock to the beam.

9. The wheel restraint system of claim 8, wherein the retracting mechanism is a hoist with a tether from which the wheel chock is suspended.

10. The wheel restraint system of claim 8, wherein the retracting mechanism includes a resilient member.

11. The wheel restraint system of claim 10, wherein the resilient member is a spring.

12. The wheel restraint system of claim 11, wherein the wheel restraint is a counterbalancer, and the spring is a coiled band spring.

13. The wheel restraint system of claim 8, wherein the retracting mechanism is a linear actuator.

14. The wheel restraint system of claim 1, wherein the chock anchor is disposed laterally of the vehicle approach path and the wheel chock in the blocking position.

15. The wheel restraint of claim 14, further comprising the wheel including a pin releasably coupling the wheel chock to the chock anchor, whereby the pin selectively couples with at least one hole of a series of holes at the chock anchor.

16. The wheel restraint of claim 14, wherein the chock anchor is attachable to a driveway of the loading dock, wherein the driveway is a surface upon which the vehicle travels as the vehicle enters the loading dock.

17. The wheel restraint of claim 16, wherein the chock anchor includes an elevated rail spaced apart from the driveway.

18. The wheel restraint of claim 17, wherein the rail is positioned to help guide the wheel as the vehicle approaches the loading dock.

19. The wheel restraint of claim 1, wherein the loading dock defines two doorways, and the beam can translate therebetween.

20. The wheel restraint of claim 1, wherein an electrical line extends along the beam and descends to the wheel chock.

21. The wheel restraint of claim 1, wherein the wheel chock is above the chock anchor when the wheel chock is in the raised position.

22. The wheel restraint of claim 1, wherein the elongate beam is movable between a first position at which the beam is outside of the approach path and a second position at which the beam is substantially aligned with the approach path.

* * * * *